(12) United States Patent
Sahu et al.

(10) Patent No.: US 8,236,463 B2
(45) Date of Patent: Aug. 7, 2012

(54) MAGNETIC CURRENT COLLECTOR

(75) Inventors: Saroj Kumar Sahu, Mountain House, CA (US); Suresh Kumar Surapalan Nair, Fremont, CA (US); Ali Firouzi, Los Altos, CA (US)

(73) Assignee: Deeya Energy, Inc., Fremont, CA (US)

( * ) Notice: Subject to any disclaimer, the term of this patent is extended or adjusted under 35 U.S.C. 154(b) by 0 days.

(21) Appl. No.: 12/576,235

(22) Filed: Oct. 8, 2009

(65) Prior Publication Data

US 2010/0092807 A1   Apr. 15, 2010

Related U.S. Application Data

(60) Provisional application No. 61/104,609, filed on Oct. 10, 2008.

(51) Int. Cl.
*H01M 8/00* (2006.01)
(52) U.S. Cl. .......... 429/535; 429/10; 429/498; 429/507; 427/115
(58) Field of Classification Search .................. 429/535; 427/115
See application file for complete search history.

(56) References Cited

U.S. PATENT DOCUMENTS

| | | |
|---|---|---|
| 3,540,934 A | 11/1970 | Boeke |
| 3,996,064 A | 12/1976 | Thaller |
| 4,133,941 A | 1/1979 | Sheibley |
| 4,159,366 A | 6/1979 | Thaller |
| 4,309,372 A | 1/1982 | Sheibley |
| 4,312,735 A | 1/1982 | Grimes et al. |
| 4,414,090 A | 11/1983 | D'Agostino et al. |
| 4,454,649 A | 6/1984 | Jalan et al. |
| 4,468,441 A | 8/1984 | D'Agostino et al. |
| 4,485,154 A | 11/1984 | Remick et al. |
| 4,496,637 A | 1/1985 | Shimada et al. |
| 4,543,302 A | 9/1985 | Gahn et al. |
| 4,732,827 A | 3/1988 | Kaneko et al. |
| 4,784,924 A | 11/1988 | Savinell et al. |
| 4,814,241 A | 3/1989 | Nagashima et al. |
| 4,828,666 A | 5/1989 | Iizuka et al. |
| 4,874,483 A | 10/1989 | Wakabayashi et al. |
| 4,882,241 A | 11/1989 | Heinzel |
| 4,894,294 A | 1/1990 | Ashizawa et al. |
| 4,929,325 A | 5/1990 | Bowen et al. |
| 4,945,019 A | 7/1990 | Bowen et al. |
| 4,948,681 A | 8/1990 | Zagrodnik et al. |
| 4,956,244 A | 9/1990 | Shimizu et al. |
| 5,061,578 A | 10/1991 | Kozuma et al. |

(Continued)

FOREIGN PATENT DOCUMENTS

DE    102006007206    10/2006

(Continued)

OTHER PUBLICATIONS

Search Report for PCT Application No. PCT/US2009/049285.

(Continued)

*Primary Examiner* — Robert Hodge
*Assistant Examiner* — Patricia Davis
(74) *Attorney, Agent, or Firm* — Haynes and Boone LLP

(57) ABSTRACT

An electrode for use in a flow cell is presented. The electrode includes a metal plate for collecting current in the electrode that is bonded between a first and second plate.

7 Claims, 13 Drawing Sheets

U.S. PATENT DOCUMENTS

| | | | |
|---|---|---|---|
| 5,162,168 A | 11/1992 | Downing et al. | |
| 5,188,911 A | 2/1993 | Downing et al. | |
| 5,258,241 A | 11/1993 | Ledjeff et al. | |
| 5,366,824 A | 11/1994 | Nozaki et al. | |
| 5,648,184 A | 7/1997 | Inoue et al. | |
| 5,656,390 A | 8/1997 | Kageyama et al. | |
| 5,665,212 A | 9/1997 | Zhong et al. | |
| 5,759,711 A | 6/1998 | Miyabayashi et al. | |
| 5,851,694 A | 12/1998 | Miyabayashi et al. | |
| 6,005,183 A | 12/1999 | Akai et al. | |
| 6,040,075 A | 3/2000 | Adcock et al. | |
| 6,086,643 A | 7/2000 | Clark et al. | |
| 6,461,772 B1 | 10/2002 | Miyake et al. | |
| 6,475,661 B1 | 11/2002 | Pellegri et al. | |
| 6,509,119 B1 | 1/2003 | Kobayashi et al. | |
| 6,524,452 B1 | 2/2003 | Clark et al. | |
| 6,555,267 B1 | 4/2003 | Broman et al. | |
| 6,656,639 B1 | 12/2003 | Hagg et al. | |
| 6,692,862 B1 | 2/2004 | Zocchi | |
| 6,759,158 B2 | 7/2004 | Tomazic | |
| 6,761,945 B1 | 7/2004 | Adachi et al. | |
| 6,764,789 B1 | 7/2004 | Sekiguchi et al. | |
| 6,812,171 B2 | 11/2004 | Shimazaki et al. | |
| 6,905,797 B2 | 6/2005 | Broman et al. | |
| 6,986,966 B2 | 1/2006 | Clarke et al. | |
| 7,061,205 B2 | 6/2006 | Shigematsu et al. | |
| 7,078,123 B2 | 7/2006 | Kazacos et al. | |
| 7,199,550 B2 | 4/2007 | Tsutsui et al. | |
| 7,220,515 B2 | 5/2007 | Ito et al. | |
| 7,227,275 B2 | 6/2007 | Hennessy et al. | |
| 2003/0008203 A1 | 1/2003 | Winter | |
| 2004/0072074 A1* | 4/2004 | Partington | 429/231.5 |
| 2004/0170893 A1 | 9/2004 | Nakaishi et al. | |
| 2004/0202915 A1 | 10/2004 | Nakaishi et al. | |
| 2004/0241544 A1 | 12/2004 | Nakaishi et al. | |
| 2005/0074653 A1 | 4/2005 | Broman et al. | |
| 2005/0156431 A1 | 7/2005 | Hennessy | |
| 2005/0156432 A1 | 7/2005 | Hennessy | |
| 2005/0158615 A1 | 7/2005 | Samuel et al. | |
| 2005/0164075 A1 | 7/2005 | Kumamoto et al. | |
| 2005/0181273 A1 | 8/2005 | Deguchi et al. | |
| 2005/0260473 A1* | 11/2005 | Wang | 429/33 |
| 2006/0204823 A1* | 9/2006 | Mazza et al. | 429/38 |
| 2007/0037058 A1 | 2/2007 | Visco et al. | |
| 2007/0072067 A1 | 3/2007 | Symons et al. | |
| 2007/0080666 A1 | 4/2007 | Ritter et al. | |
| 2007/0111089 A1 | 5/2007 | Swan | |
| 2007/0154783 A1* | 7/2007 | Jeon | 429/61 |
| 2008/0081247 A1 | 4/2008 | Nakaishi et al. | |
| 2008/0164934 A1* | 7/2008 | Hankey et al. | 327/407 |
| 2008/0193828 A1 | 8/2008 | Sahu | |
| 2008/0248343 A1* | 10/2008 | Markoski et al. | 429/15 |
| 2008/0292964 A1* | 11/2008 | Kazacos et al. | 429/231.5 |
| 2009/0218984 A1 | 9/2009 | Parakulam | |
| 2010/0003586 A1 | 1/2010 | Sahu | |
| 2010/0090651 A1 | 4/2010 | Sahu | |
| 2010/0092757 A1 | 4/2010 | Nair | |
| 2010/0092807 A1 | 4/2010 | Sahu | |
| 2010/0092813 A1 | 4/2010 | Sahu | |
| 2010/0092843 A1 | 4/2010 | Conway | |
| 2010/0094468 A1 | 4/2010 | Sahu et al. | |
| 2010/0136455 A1 | 6/2010 | Winter | |
| 2010/0143781 A1 | 6/2010 | Keshavarz | |

FOREIGN PATENT DOCUMENTS

| | | | |
|---|---|---|---|
| JP | 60047373 | | 3/1985 |
| JP | 60070672 | | 4/1985 |
| JP | 60115174 | | 6/1985 |
| JP | 1060967 | | 3/1989 |
| JP | 1320776 | | 12/1989 |
| JP | 2027667 | | 1/1990 |
| JP | 2027668 | | 1/1990 |
| JP | 3017963 | | 1/1991 |
| JP | 6290796 | | 10/1994 |
| JP | 8007913 | | 1/1996 |
| JP | 10012260 | | 1/1998 |
| JP | 10208766 | | 8/1998 |
| JP | 11329474 | * | 11/1999 |
| JP | 2000058099 | | 2/2000 |
| JP | 2000200619 | | 7/2000 |
| JP | 2002015762 | | 1/2002 |
| JP | 2002175822 | | 6/2002 |
| JP | 2002289233 | | 10/2002 |
| JP | 2002367661 | | 12/2002 |
| JP | 2003173812 | | 6/2003 |
| JP | 2005142056 | | 6/2005 |
| JP | 2005228622 | | 8/2005 |
| JP | 2005228633 | | 8/2005 |
| JP | 2005322447 | | 11/2005 |
| JP | 2006114360 | | 4/2006 |
| JP | 2006147306 | | 6/2006 |
| JP | 2006147376 | | 6/2006 |
| JP | 2006313691 | | 11/2006 |
| JP | 2006351346 | | 12/2006 |
| JP | 2007087829 | | 4/2007 |
| WO | 8905528 | | 6/1989 |
| WO | 903666 | | 4/1990 |
| WO | 03005476 | | 1/2003 |
| WO | 2004079849 | | 9/2004 |
| WO | PCTAU200600856 | * | 6/2006 |
| WO | 2006135958 | | 12/2006 |

OTHER PUBLICATIONS

Office Action for U.S. Appl. No. 12/217,059 mailed Aug. 23, 2010.
Office Action for U.S. Appl. No. 12/577,137 mailed Sep. 7, 2010.
Final Office Action for U.S. Appl. No. 12/577,127 mailed Aug. 19, 2010.

* cited by examiner

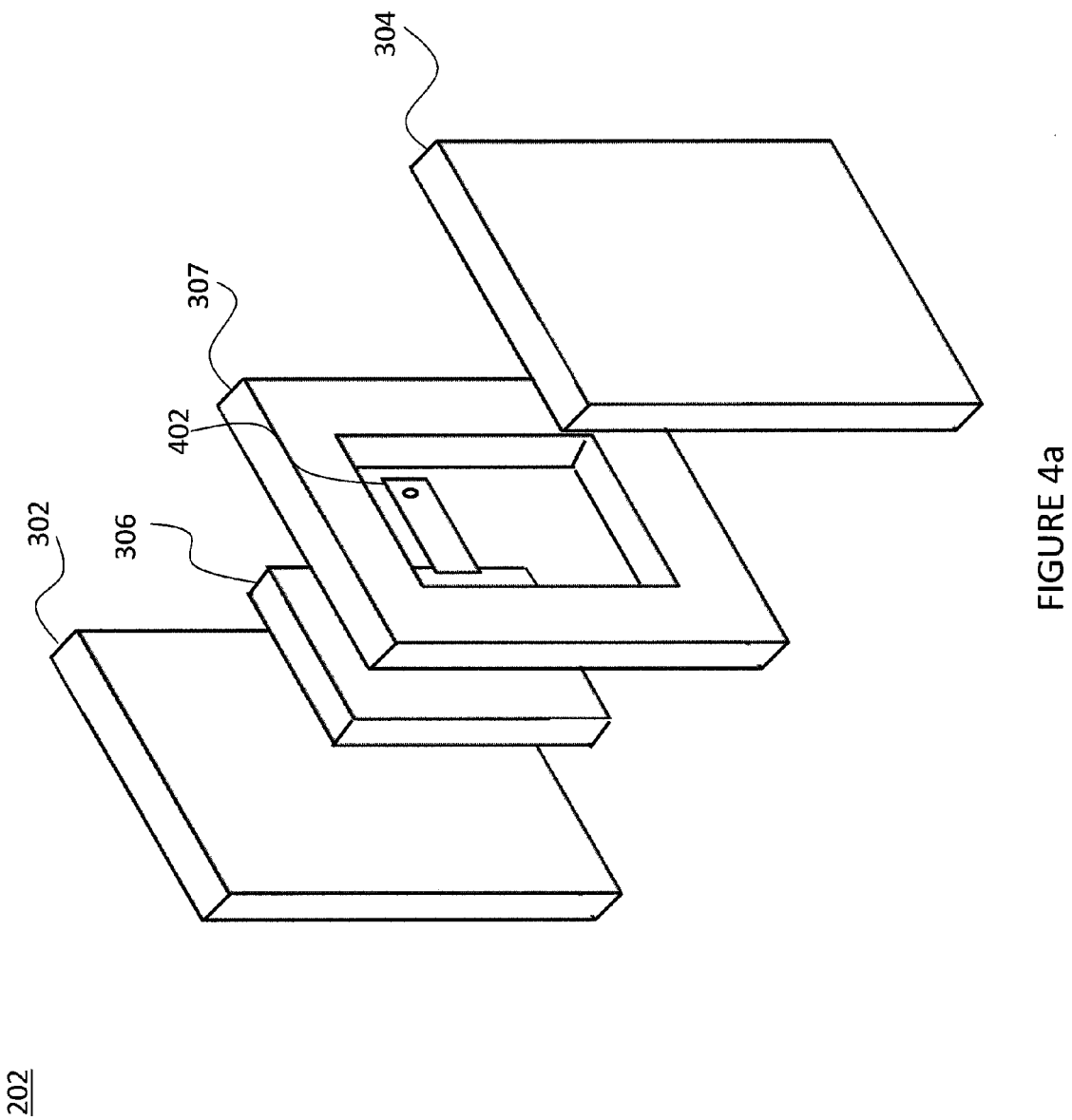

MAGNETIC CURRENT COLLECTOR

CROSS-REFERENCE TO RELATED APPLICATIONS

The present application claims benefit under 35 U.S.C. §119(e) of U.S. Provisional Application No. 61/104,609 filed on Oct. 10, 2008, entitled "Magnetic Current Collector," the content of which is hereby incorporated by reference in its entirety.

BACKGROUND

1. Field of the Invention

The present invention relates to the field of flow batteries and, in particular, to methods and systems for collecting current in a flow battery.

2. Discussion of Related Art

Flow batteries store electrical energy in a chemical form, and subsequently dispense the stored energy in an electrical form via a spontaneous reverse reduction-oxidation (redox) reaction.

As such, a flow battery is an electrochemical storage device in which an electrolyte containing one or more dissolved electro-active species flows through a reactor cell where chemical energy is converted to electrical energy. Conversely, the discharged electrolyte can be flowed through a reactor cell and electrical energy converted to chemical energy. Electrolyte is stored externally, for example in tanks, and flowed through a set of cells where the electrochemical reaction takes place. Externally stored electrolytes can be flowed through the battery system by pumping, gravity feed, or by any other method of moving fluid through the system. The reaction in a flow battery is reversible. The electrolyte, then, can be recharged without replacing the electroactive material.

The minimal unit that performs the electrochemical energy conversion is generally called a "cell", whether in the case of flow batteries, fuel cells or secondary batteries. A device that integrates many such cells, coupled electrically in series or parallel, to get higher current or voltage or both, is generally called a "battery". However, it is common to refer to any collection of coupled cells, including a single cell used on its own, as a battery. As such, a single cell can be referred to interchangeably as a "cell" or a "battery".

Flow batteries can be utilized in many technologies that require the storage of electrical energy. For example, flow batteries can be utilized for storage of night-time electricity that is inexpensive to produce to provide electricity during peak demand when electricity is more expensive to produce or demand is beyond the capability of current production. Such batteries can also be utilized for storage of green energy (i.e., energy generated from renewable sources such as wind, solar, wave, or other non-conventional sources).

Many devices that operate on electricity are adversely affected by the sudden removal of their power supply. Flow batteries can be utilized as uninterruptible power supplies in place of more expensive backup generators. Efficient methods of power storage can provide for devices to have a built-in backup that mitigates the effects of power cuts or sudden power failures. Power storage devices can also reduce the impact of a failure in a generating station. Other situations where uninterruptible power supplies can be of importance include, but are not limited to, buildings where uninterrupted power is critical such as hospitals. Such batteries can also be utilized for providing an uninterruptible power supply in developing countries, many of which do not have reliable electrical power sources resulting in intermittent power availability.

Another possible use for flow batteries is in electric vehicles. Electric vehicles can be rapidly "recharged" by replacing the electrolyte. The electrolyte can be recharged separately and reused.

The flow cell works by changing the oxidation state of its constituents during charging or discharging. The basic flow cell includes two half cells connected in series by the conductive electrolyte, one for anodic reaction and the other for cathodic reaction. Each half cell includes an electrode with a defined surface area upon which the redox reaction takes place. Electrolyte flows through the half cell as the redox reaction takes place. The two half cells are separated by an ion-exchange membrane (IEM) where either positive ions or negative ions pass through the membrane. Multiple such cells can be electrically coupled (e.g., stacked) either in series to achieve higher voltage or in parallel in order to achieve higher current. The reactants are stored in separate tanks and dispensed into the cells as necessary in a controlled manner to supply electrical power to a load.

Problems that can affect the performance of a flow cell are the transfer of current from the site where the electrochemical reaction takes place and the collection of current at an electrode of the flow cell. Various factors such as defects on the surface of electrodes, material composition and properties of the electrodes, sealing of the electrodes, and other such factors affect the flow and collection of current. There is, therefore, a need for improved current collection in order to increase the performance and efficiency of a flow battery.

SUMMARY

Consistent with the present invention, an electrode for use in a flow cell can include a first plate; a second plate; and a metal plate for collecting a current, wherein the metal plate is bonded between the first and second plate.

These and other embodiments of the present invention are further described below with reference to the following figures.

BRIEF DESCRIPTION OF THE DRAWINGS

In order to more fully understand the present invention, reference is made to the accompanying drawings, with the understanding that these drawings are not intended to limit the scope of the invention.

FIGS. 4a and 4b illustrate another electrode consistent with some embodiments of the present invention.

In the figures, elements having the same designation have the same or substantially similar function. The figures are illustrative only and relative sizes and distances depicted in the figures are for convenience of illustration only and have no further meaning.

DETAILED DESCRIPTION

A flow cell is the minimal component of a flow battery. Multiple flow cells are coupled (e.g., stacked) to form a multi-cell battery. The cell includes two half cells separated by a membrane, through which ions are transferred during a reduction-oxidation (redox) reaction. One half cell contains the anolyte and the other half cell contains the catholyte. The electrolytes (anolyte and catholyte) are flowed through the half cells, often with an external pumping system. Electrodes in each half cell provide surfaces on which the redox reaction takes place and from which charge is transferred.

Figure 1:
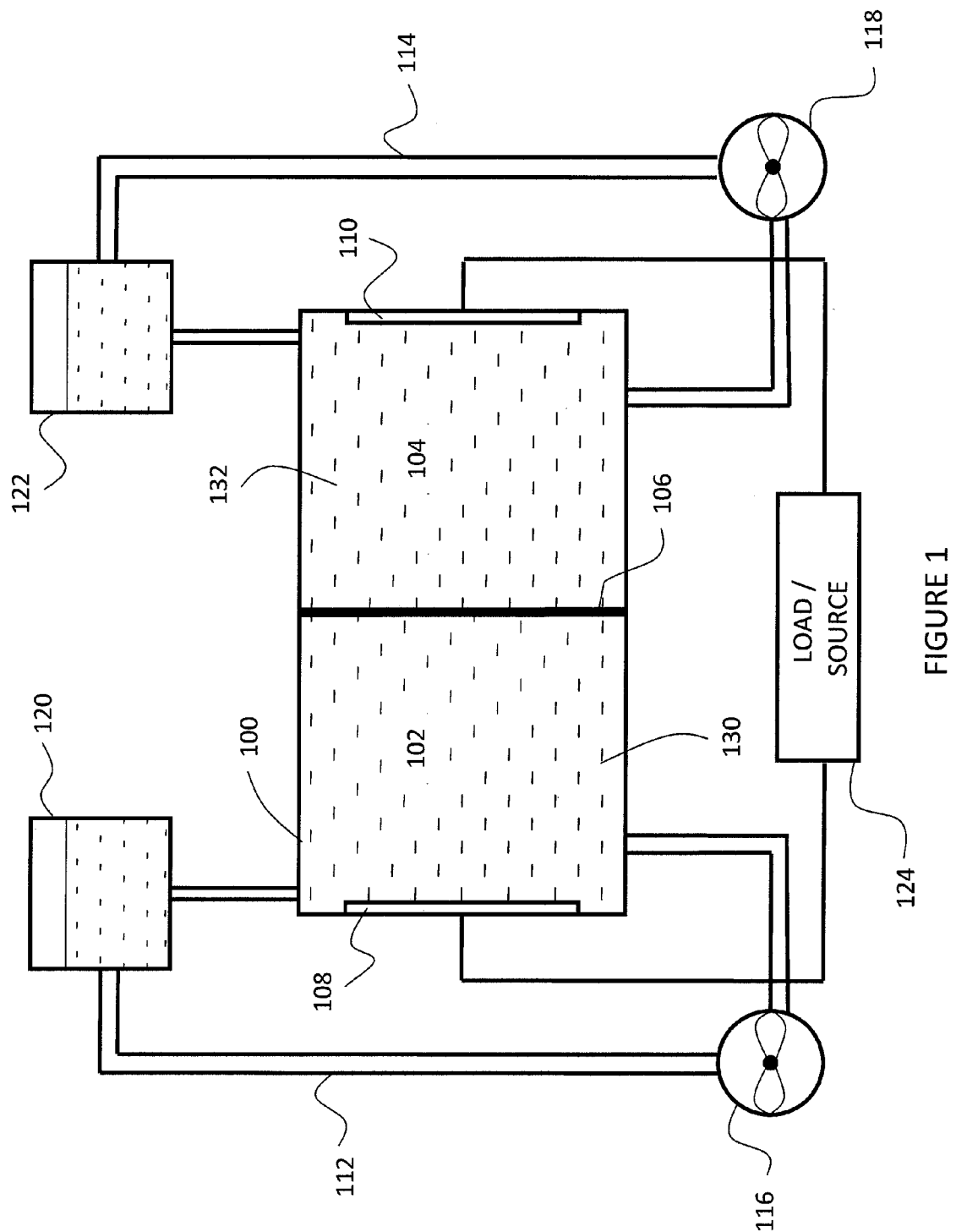
FIG. 1 illustrates a flow battery that is consistent with some embodiments of the present invention.

FIG. 1 illustrates a flow cell 100 consistent with some embodiments of the present invention. Flow cell 100 includes two half cells 102 and 104 separated by an ion exchange membrane (IEM) 106. Half cells 102 and 104 include electrodes 108 and 110, respectively, in contact with an electrolyte 130 or 132 such that an anodic reaction occurs at the surface of one of electrodes 108 or 110 and a cathodic reaction occurs at the surface of the other one of electrodes 108 or 110. Electrolyte 130 or 132 flows through each of half cells 102 and 104, respectively, as a redox reaction takes place.

As shown in FIG. 1, the electrolyte 130 in half cell 102 may be pumped through pipe 112 by pump 116 to holding tank 120. Similarly, the electrolyte 132 in half cell 104 can be pumped through pipe 114 by pump 118 to holding tank 122. In some embodiments, holding tanks 120 and 122 may segregate electrolyte that has flowed through cell 100 from electrolyte that has not. However, mixing discharged or partially discharged electrolyte may also be performed.

Figure 2:
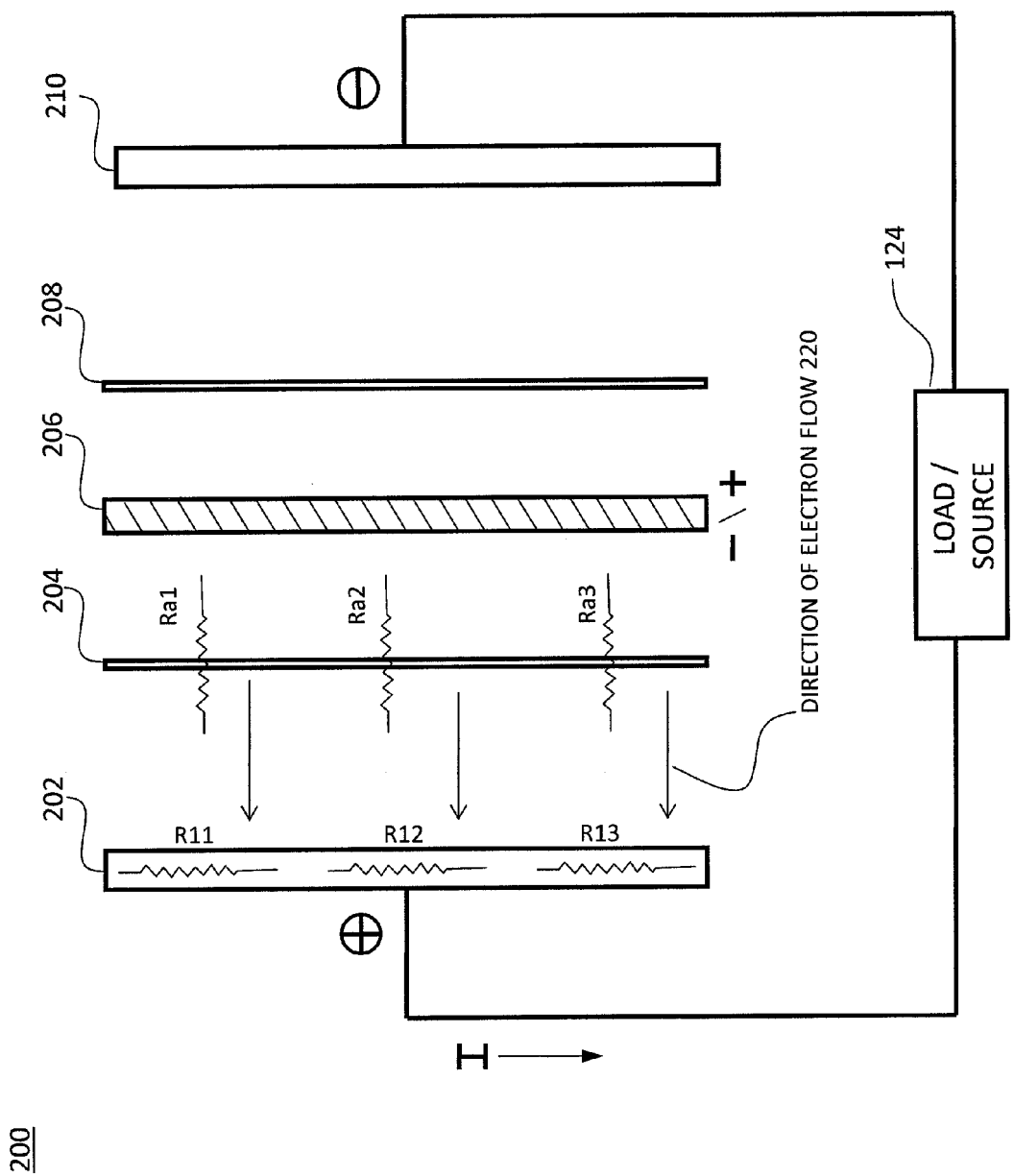
FIG. 2 illustrates an electrode assembly of a flow battery a flow battery consistent with some embodiments of the present invention.

Electrodes 108 and 110 can be coupled to either supply electrical energy or receive electrical energy from load or source 124. Other monitoring and control electronics, included in load 124, can control the flow of electrolyte through half cells 102 and 104. Multiple ones of cells 100 can be electrically coupled ("stacked") in series to achieve higher voltage or in parallel in order to achieve higher current. FIG. 2 illustrates an electrode and IEM assemble of one such stacked arrangement of a flow battery 200.

As illustrated in FIG. 2, in some embodiments, flow battery 200 can include end electrodes (end plates) 202 and 210, IEMs (204 and 208) and a bi-polar plate 206. The end plates 202 and 210 can be coupled to load/source 124. For convenience, a flow battery stack with two flow cells is illustrated in FIG. 2. However, there may be any number of cells in battery 200. Therefore, the present disclosure is not limited in the number of cells that may be included and supported by a flow battery that is consistent with the present invention.

In any flow battery such as battery 200, resistivity ($\rho$) is an important parameter as it determines the efficiency of battery 200. The resistivity of the end plates (202 and 210) and bi-polar plate 206 can affect the flow of electrons in a flow battery. Because electrons flow (in a direction 220 as shown in FIG. 2) and a current (I) is collected at end plate 202, for the proper functioning of flow battery 200, the conductivity (inverse of resistivity) of end plate 202 needs to be high. The resistivity of a material is given by $\rho = R*A/L$, where R is the resistance, L is the length, and A is the cross-sectional area of the material. Although current (I) flows through cell 200 in a direction perpendicular to the surface of electrode 202, once in electrode 202 current (I) travels in the plane of end plate 202. As shown in FIG. 2, resistances ($R_{11}, R_{12}, R_{13}$) depict the resistance for current travelling in the plane of end plate 202 and resistances ($R_{a1}, R_{a2}, R_{a3}$) depict the resistance in a direction perpendicular to the surface of end plate 202. Resistances ($R_{a1}, R_{a2}, R_{a3}$) and ($R_{11}, R_{12}, R_{13}$) are illustrated in FIG. 2 as examples and are not intended to limit flow battery 200. There may be any number of resistances that can exist on any end plate and/or bi-polar plate in battery 200. Therefore, the present disclosure is not limited in the number of internal resistances that may be included and supported by a flow battery that is consistent with the present invention.

The existence of resistances $R_{11}, R_{12}$, and $R_{13}$ can create a potential difference across the surface of end plate 202. This difference in potential can result in a non-uniform electron flow which can further reduce the amount of current collected across end plate 202, thereby causing a decrease in the efficiency of battery 200. High conductivity across end plate 202 can be achieved by minimizing resistances $R_{11}, R_{12}$, and $R_{13}$.

In the following description, end plate 202 is used only for exemplary purposes to describe any end plate that can be included in a flow battery consistent with the present invention. It should be understood that end plate 202 and end plate 210 have similar, if not identical structures.

Figure 3A:
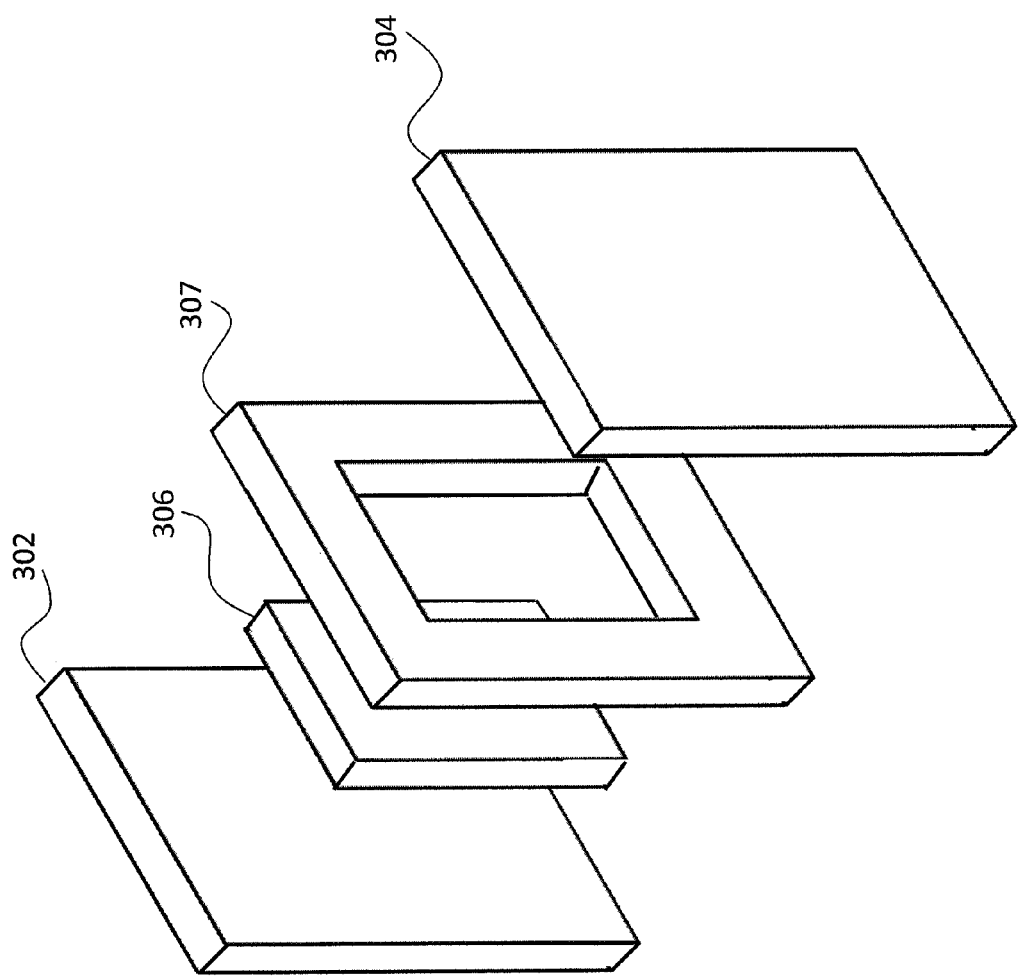
FIGS. 3a and 3b illustrate an electrode consistent with some embodiments of the present invention.
Figure 3B:
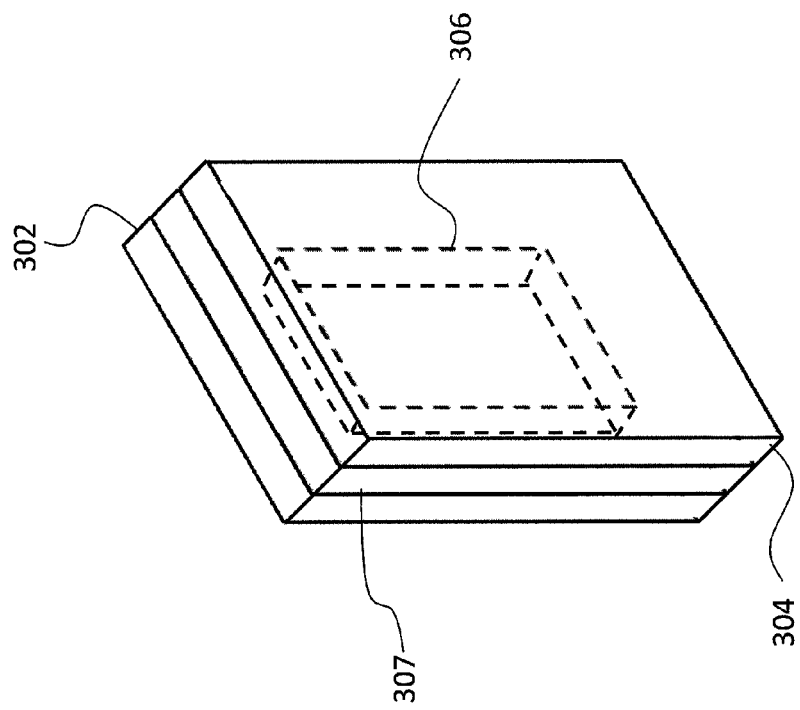

FIGS. 3a and 3b illustrate end plate 202 consistent with some embodiments of the present invention. End plate 202 can include plates (302 and 304) and a metal plate 306. Plates (302 and 304) can, for example, be any plastic or polymeric plastic or other such plastic materials that is conducting. In some embodiments, plates 302 and 304 can be a carbon fiber infused plastic plate. Metal plate 306 can be formed of any metal having a high conductivity, for example lead, aluminum, copper, gold, silver or other such conductive metals. Further, metal plate 306 can be a solid conducting sheet of any appropriate thickness, may be a wire mesh, or may be any other configuration that allows the transport of current across plate 306. Furthermore, metal plate 306 may be rectangular in shape or may be any other shape.

As shown in FIG. 3a, metal plate 306 can be embedded between plates 302 and 304. In some embodiments, end plate 202 can also include a frame 307 that can be placed between metal plate 306 and plate 304 (as shown in FIG. 3b). Frame 307 can include the same plastic or polymeric plastic materials as plates 302 and 304. Plate 302, metal plate 306, frame 307 and plate 304 can be bonded to form end plate 202 (as shown in FIG. 3b), for example by using a heat press or other such bonding methods. Because the conductivity of metal plate 306 is generally much higher than that of plates 302 and 304, the presence of metal plate 306 in end plate 202 facilitates the transfer of current within the plane of end plate 202. Referring back to FIG. 2, cabling 222 is coupled to end plate 202 to couple end plate 202 with load/source 124.

Figure 4B:
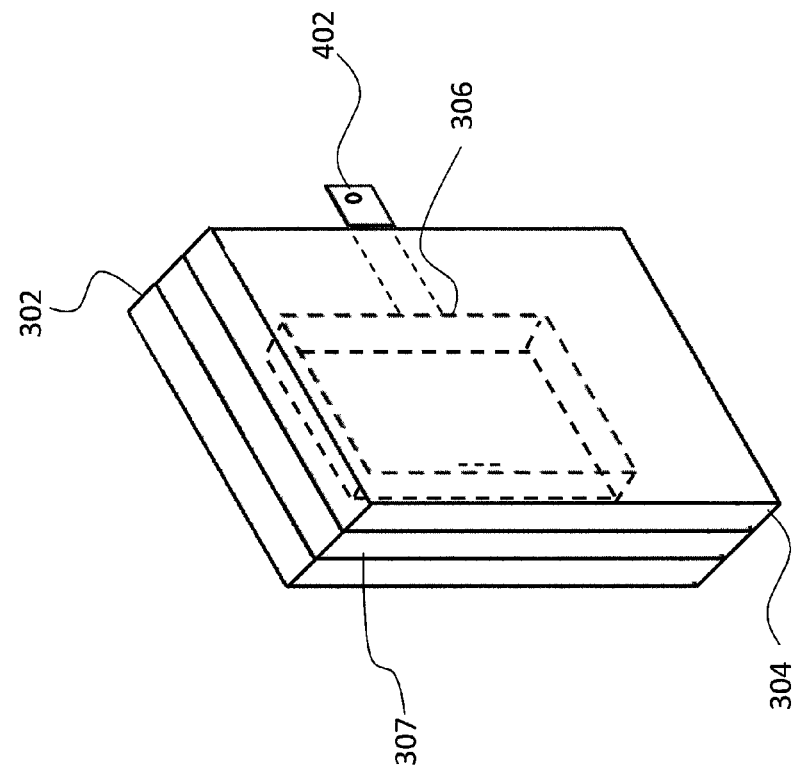

FIGS. 4a and 4b illustrate end plate 202 consistent with some embodiments of the present invention. As shown in FIG. 4a, metal plate 306 can further include an ear section 402 that can be coupled to the load/source 124 (not shown in FIGS. 4a and 4b). In other embodiments, the ear section can be formed from a separate piece attached to metal plate 306. For convenience, FIGS. 4a and 4b depict ear section 402 as being included at the right hand side of metal plate 306. However, ear section 402 can extend from the edge anywhere on metal plate 306, and extends through a seal formed by plates 302 and 304. The present disclosure is not limited in the location of an ear section that may be included and supported by a flow battery that is consistent with the present invention. A cable, which can be utilized to couple end plate 202 with load/source 124 (as shown in FIG. 2), can then be attached to ear section 402, for example by soldering or with a rigid connector. Plate 302, metal plate 306, frame 307 and plate 304 can be bonded to form end plate 202 (as shown in FIG. 4b), for example by using a heat press or other such bonding methods.

Figure 5A:
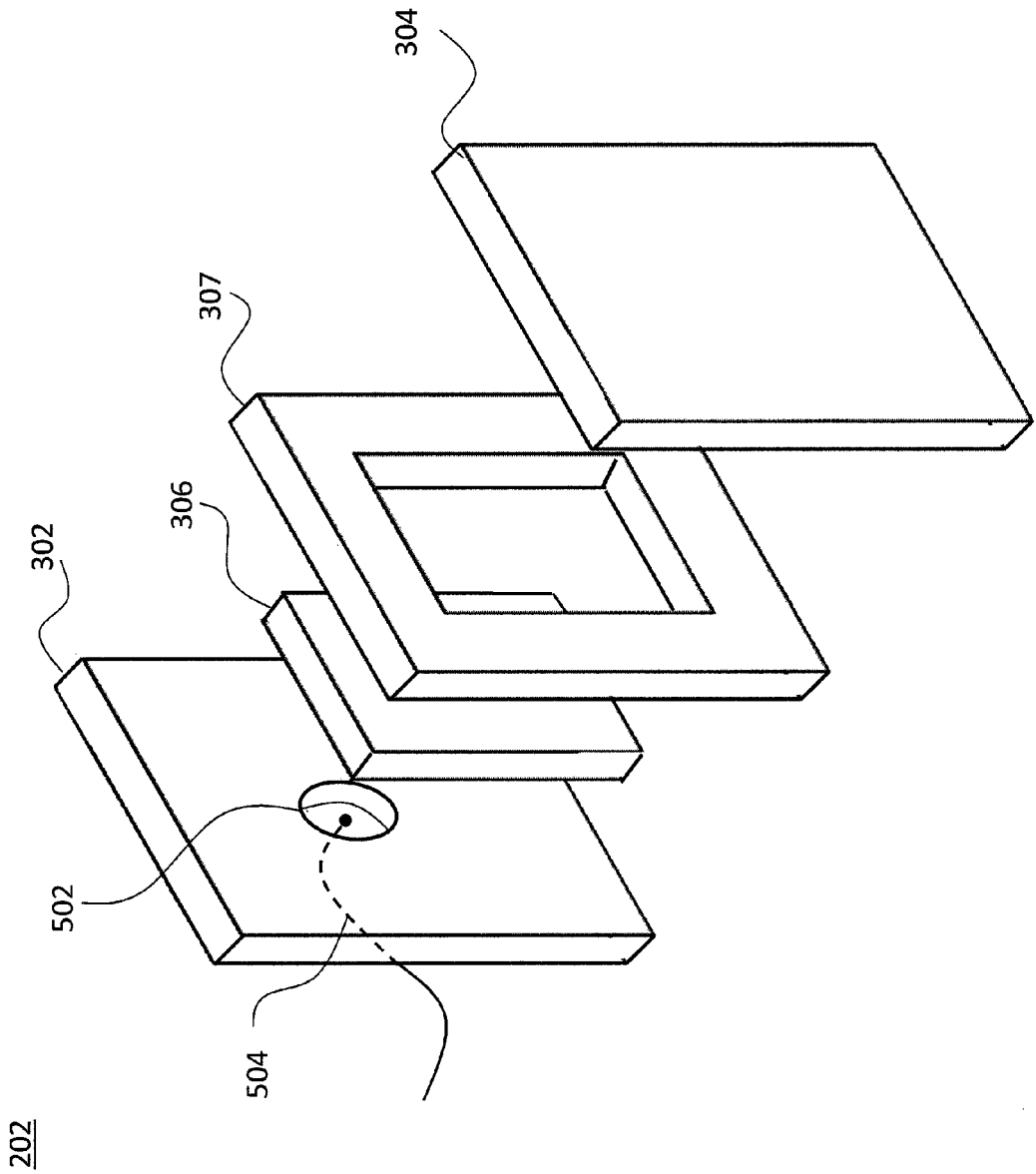
FIGS. 5a and 5b illustrate yet another electrode consistent with some embodiments of the present invention.
Figure 5B:
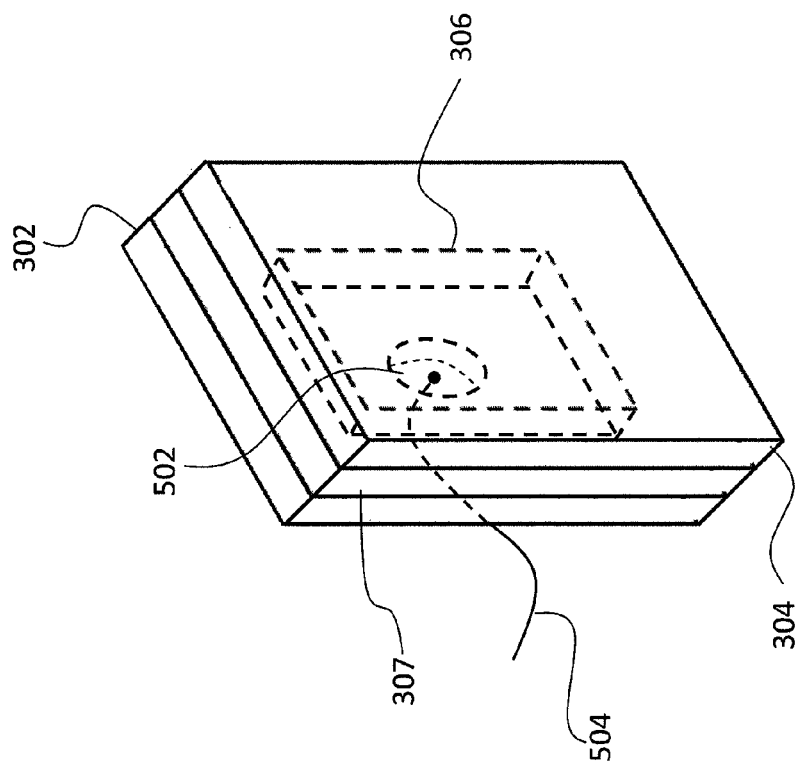

FIGS. 5a and 5b illustrate end plate 202 consistent with some embodiments of the present invention. As shown in FIG. 5a, plate 302 can include an opening 502. For convenience, FIGS. 5a and 5b depict opening 502 as being included in the center of plate 302. However, opening 502 can be included anywhere on plate 302. Therefore, the present disclosure is not limited in the location of an opening that may be included and supported by a flow battery that is consistent with the present invention.

End plate 202 can further include a connector 504 that can be coupled to metal plate 306 by soldering or other such coupling methods. Connector 504 may couple with metal plate 306 through opening 502 in plate 302. Connector 504 can include cables, electrical wires, or other such conducting connectors. End plate 202 can be coupled to load/source 124 (not shown in FIGS. 5a and 5b) by connector 504. Plate 302, metal plate 306, frame 307 and plate 304 can be bonded to form end plate 202 (as shown in FIG. 5b), for example by using a heat press or other such bonding methods.

Figure 6A:
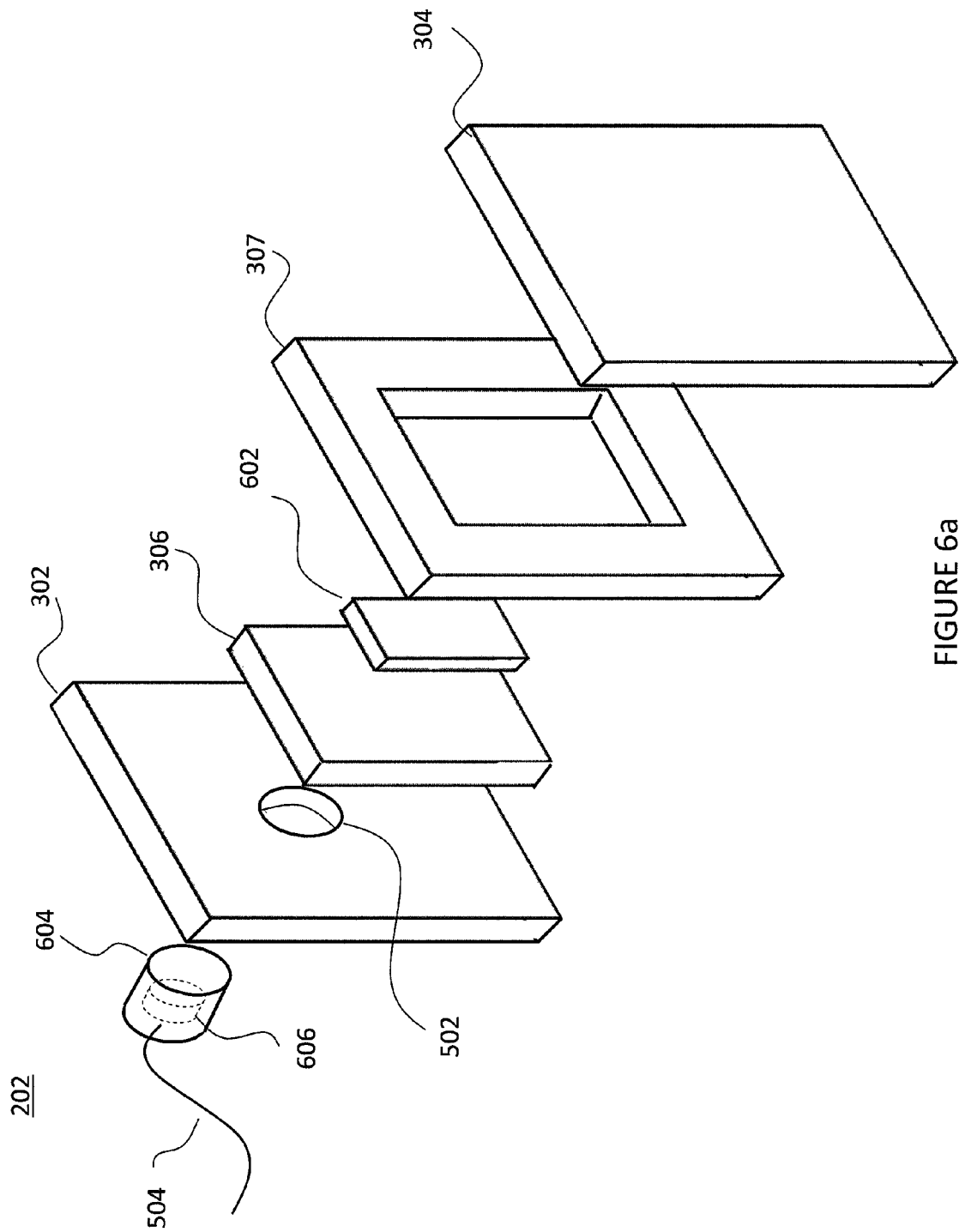
FIGS. 6a, 6b and 6c illustrates yet another electrode consistent with some embodiments of the present invention.
Figure 6B:
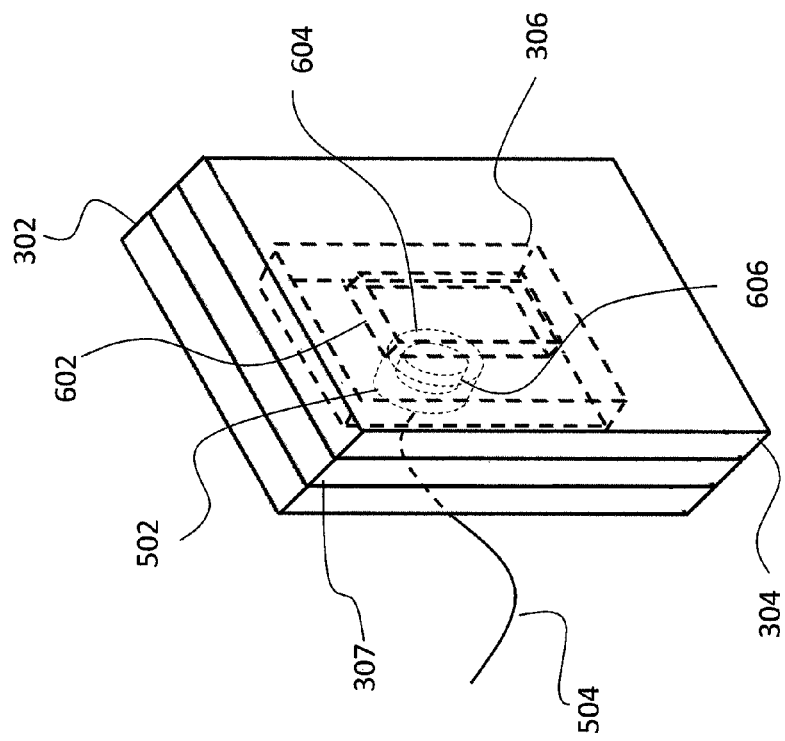

FIGS. 6a and 6b illustrate end plate 202 consistent with some embodiments of the present invention. As shown in FIG. 6a, end plate 202 can include a magnetic plate 602 that can be placed on metal plate 306. Magnetic plate 602 can be of any shape and can include highly magnetic metals such as magnetic steel or other such highly magnetic metals. In some embodiments, end plate 202 can further include an end cap 604 and a magnet 606. End cap 604 can include metals such as copper, aluminum or other such highly conductive metals and magnet 606 can include a rare earth magnet, or other such magnets.

As shown in FIGS. 6a and 6b, end cap 604 can include a hollow section which can accommodate magnet 606. Magnet 606 can further magnetically couple end cap 604 with metal plate 306 due to the magnetic attraction between magnet 606 and magnetic plate 602. End cap 604 may couple with metal plate 306 through opening 502 in plate 302. End plate 202 can be coupled with load/source 124 (not shown in FIGS. 6a and 6b) through end cap 604. Plate 302, metal plate 306, magnetic plate 602, frame 307 and plate 304 can be bonded together to form end plate 500, for example by using a heat press or other such bonding methods.

Figure 6C:
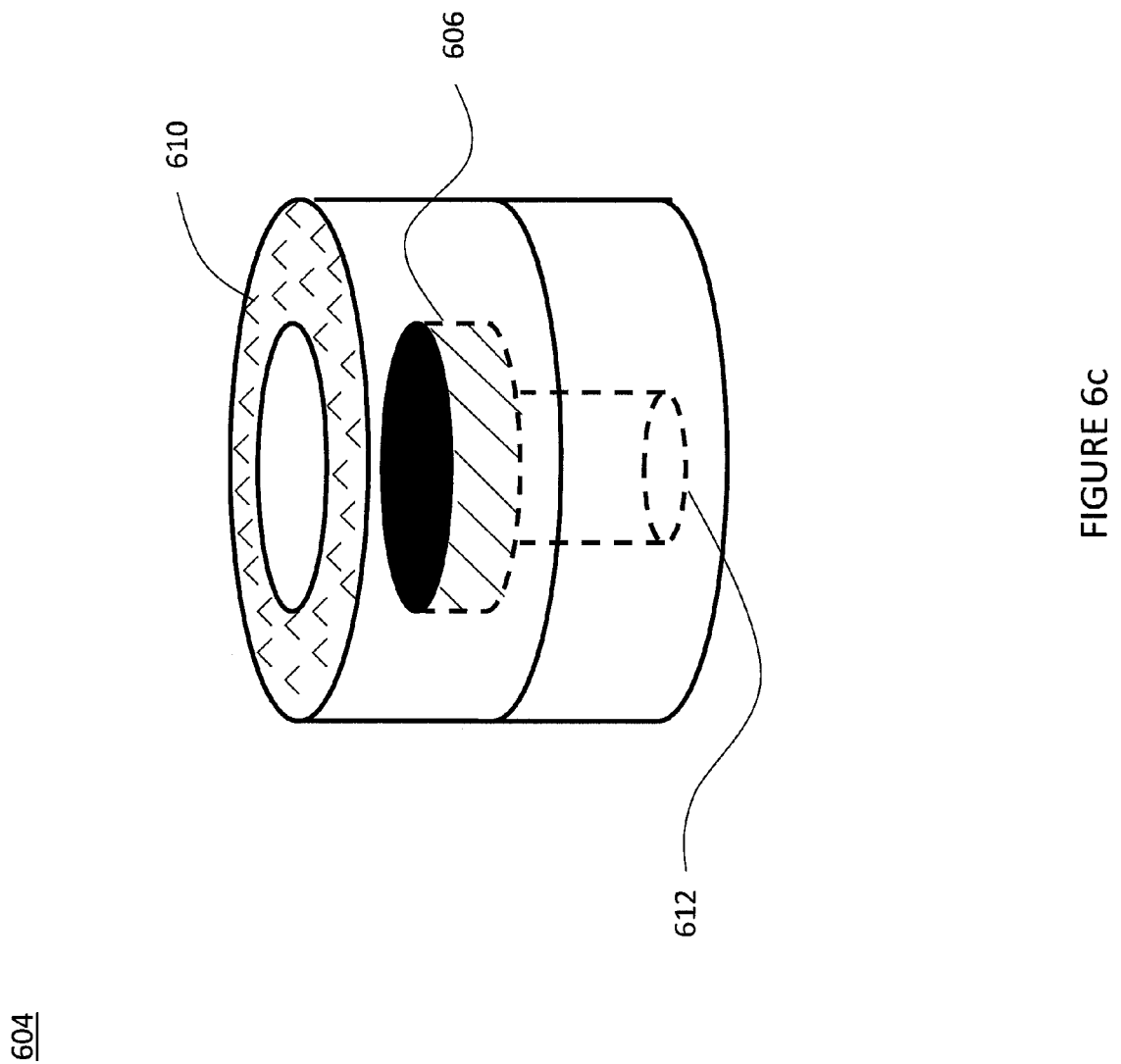

FIG. 6c illustrates end cap 604 that is consistent with some embodiments of the present invention. As shown in FIG. 6c, end cap 604 can include a grip profile 610. Grip profile 610 can include a diamond profile, a pyramid profile or other such profiles than can enable end cap 604 to maintain a firm contact (grip) and therefore a good electrical connection, with metal plate 306 due to the magnetic attraction between magnet 606 (as shown in FIGS. 6a and 6b) and magnetic plate 602. In some embodiments, end cap 604 can include a harness opening 612 to couple to connector 504. End plate 202 can be coupled with load/source 124 by end cap 604 using connector 504.

Figure 7A:
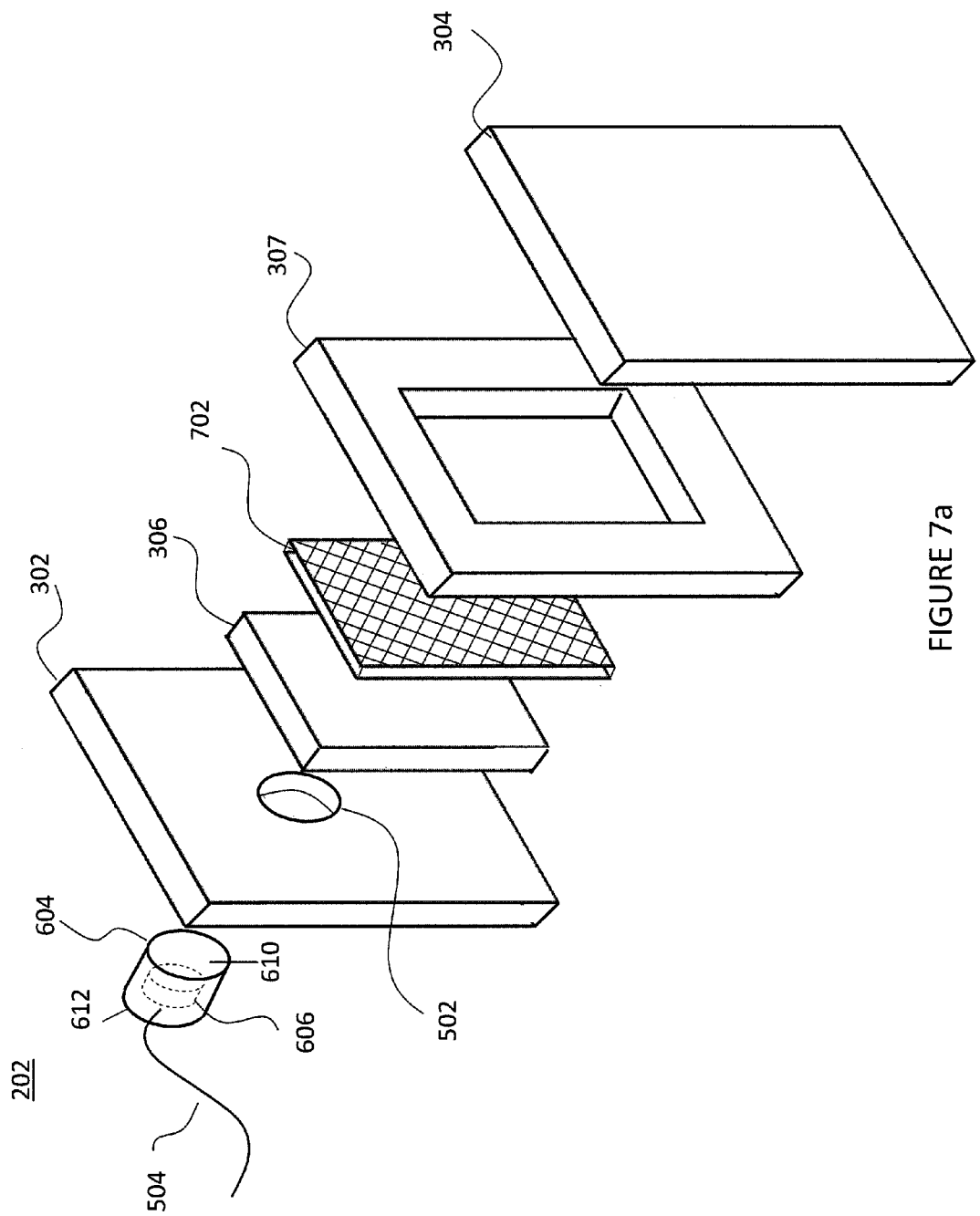
FIGS. 7a and 7b illustrate yet another electrode consistent with some embodiments of the present invention.
Figure 7B:
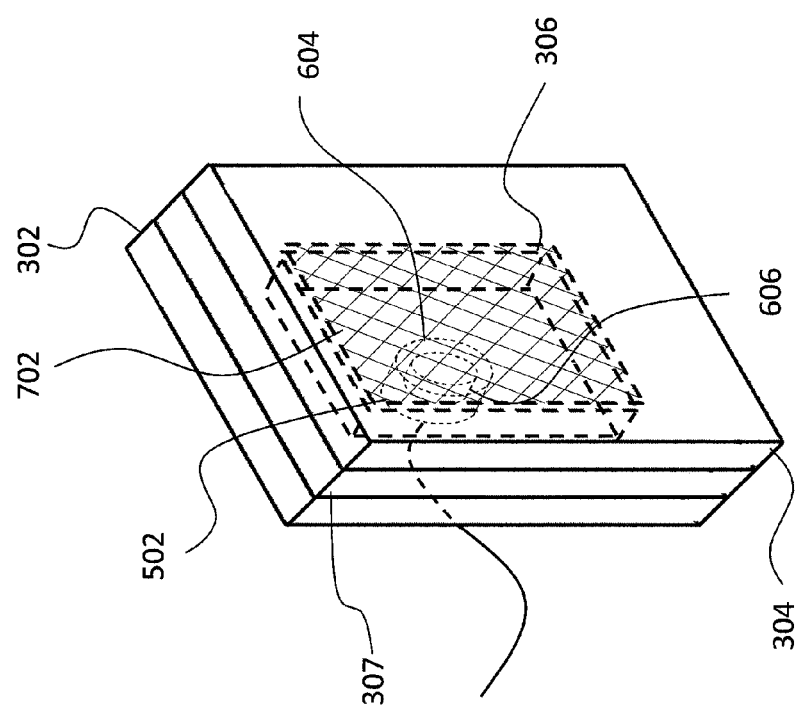

FIGS. 7a and 7b illustrate end plate 202 consistent with some embodiments of the present invention. In some embodiments, to further increase the efficiency of battery 200, end plate 202 can include a metal mesh 702. Opening of the metal mesh can be, for example, circular, square, rectangular, hexagonal, and the like. Metal mesh 702 can include a steel mesh, copper mesh or other such highly conductive metallic mesh. End plate 202 can further include a connector 504 that can be coupled to metal plate 306 by soldering or other such coupling means. As shown in FIG. 7b, plate 302, metal plate 306, magnetic plate 602, metal mesh 702, frame 307, and plate 304 can be bonded together, for example by using a heat press or other such bonding methods.

In view of the embodiments described herein, the present invention has been shown to provide a means of collecting current that optimizes the system efficiency of a flow battery. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of manufacturing an end plate for collecting current in a flow cell battery system, comprising: providing a first and second polymeric conducting plate;

forming an opening in the first polymeric conducting plate; bonding a conducting metal plate and a magnetic plate between the first polymeric conducting plate and the second polymeric conducting plate, the conducting metal plate having the current directed therethrough; and providing an end cap with a magnet formed therein that is inserted into the opening in the first polymeric conducting plate to electrically contact the conducting metal plate, the end cap having a magnet formed therein, wherein the end cap is removably coupled to the conducting metal plate of the end plate by a magnetic field created between the magnet in the end cap and the magnetic plate, and wherein the end cap receives the current from the conducting metal plate.

2. The method of claim 1, wherein at least one of the first or second polymeric conducting plates is a bi-polar plate.

3. The method of claim 1, further comprising coupling a metal mesh to the conducting metal plate.

4. The method of claim 1, further comprising coupling a first frame between the conducting metal plate and at least one of the first or second polymeric conducting plate.

5. The method of claim 1, wherein providing the end cap comprises providing an end cap having a gripping surface formed on at least one side of the end cap.

6. The method of claim 5, wherein the gripping surface is formed on a side of the end cap that contacts the conducting metal plate.

7. The method of claim 5, wherein the gripping surface is formed to have a pyramid or diamond profile.

* * * * *